US008661454B2

(12) United States Patent
Cole et al.

(10) Patent No.: US 8,661,454 B2
(45) Date of Patent: Feb. 25, 2014

(54) SYSTEM AND METHOD FOR RECEIVING AND TRANSMITTING EVENT INFORMATION

(75) Inventors: Courtney Cole, St. Michael, MN (US); Tyler Hanson, Stillwater, MN (US); Debra Viramontes, St. Paul, MN (US); Carol Richardson, Andover, MN (US); Matthew Hayes Hessinger, West Orange, NJ (US); Shannon Braun, Shakopee, MN (US)

(73) Assignee: Target Brands, Inc., Minneapolis, MN (US)

( * ) Notice: Subject to any disclaimer, the term of this patent is extended or adjusted under 35 U.S.C. 154(b) by 645 days.

(21) Appl. No.: 12/693,786

(22) Filed: Jan. 26, 2010

(65) Prior Publication Data
US 2011/0185368 A1 Jul. 28, 2011

(51) Int. Cl.
*G06F 9/44* (2006.01)
(52) U.S. Cl.
USPC ........................................................ 719/315
(58) Field of Classification Search
None
See application file for complete search history.

(56) References Cited

U.S. PATENT DOCUMENTS

| | | | |
|---|---|---|---|
| 5,357,452 A | 10/1994 | Pio-di-Savoia et al. | |
| 5,379,426 A | 1/1995 | Foss et al. | |
| 6,044,372 A * | 3/2000 | Rothfus et al. | 1/1 |
| 6,138,143 A * | 10/2000 | Gigliotti et al. | 709/203 |
| 6,425,017 B1 | 7/2002 | Dievendorff et al. | |
| 6,862,686 B1 | 3/2005 | Bahrs et al. | |
| 6,907,546 B1 | 6/2005 | Haswell et al. | |
| 6,941,546 B2 | 9/2005 | Apuzzo et al. | |
| 6,970,947 B2 | 11/2005 | Ebling et al. | |
| 6,986,125 B2 | 1/2006 | Apuzzo et al. | |
| 7,055,067 B2 | 5/2006 | DiJoseph | |
| 7,107,591 B1 | 9/2006 | Karp et al. | |
| 7,139,949 B1 | 11/2006 | Jennion et al. | |
| 7,181,686 B1 | 2/2007 | Bahrs | |
| 7,219,279 B2 | 5/2007 | Chandra et al. | |
| 7,228,524 B2 | 6/2007 | Bailey et al. | |
| 7,266,808 B2 | 9/2007 | Kolawa et al. | |
| 7,340,725 B1 | 3/2008 | Robinson et al. | |
| 7,352,762 B2 | 4/2008 | TV et al. | |
| 7,359,820 B1 | 4/2008 | Browne et al. | |
| 7,392,507 B2 | 6/2008 | Kolawa et al. | |
| 7,406,429 B2 | 7/2008 | Salonen | |
| 7,437,375 B2 | 10/2008 | Borthakur et al. | |
| 7,437,614 B2 | 10/2008 | Haswell et al. | |
| 7,535,997 B1 * | 5/2009 | McQuaide et al. | 379/88.14 |
| 7,536,678 B2 | 5/2009 | Kothari et al. | |
| 7,584,455 B2 | 9/2009 | Ball | |

(Continued)

OTHER PUBLICATIONS

IBM Research, Design Patterns Project—Example, Aug. 27, 2001 [Online], Retrieved on Apr. 14, 2009 from http://www.research.ibm.com/designpatterns/example.html, 11 pages.

(Continued)

*Primary Examiner* — Gregory A Kessler
(74) *Attorney, Agent, or Firm* — Nixon & Vanderhye P.C.

(57) ABSTRACT

In one example, a process manager is configured to receive events created by elements from other parts of enterprise software and to route the events to listeners within the enterprise software, and an evaluator is queried by the process manager and configured to determine the relationships between the event and the listeners in the enterprise software. In some embodiments, new listeners are added to the enterprise software without a significant change to the process manager.

18 Claims, 5 Drawing Sheets

(56) References Cited

U.S. PATENT DOCUMENTS

| | | | |
|---|---|---|---|
| 8,190,481 | B2 | 5/2012 | Green et al. |
| 2002/0023004 | A1 | 2/2002 | Hollander et al. |
| 2002/0042846 | A1* | 4/2002 | Bottan et al. ............ 709/249 |
| 2003/0046029 | A1 | 3/2003 | Wiener et al. |
| 2003/0086536 | A1 | 5/2003 | Salzberg et al. |
| 2004/0128305 | A1* | 7/2004 | Levin et al. ............ 707/102 |
| 2005/0038772 | A1* | 2/2005 | Colrain ............ 707/1 |
| 2006/0248405 | A1 | 11/2006 | Ponczak et al. |
| 2006/0277319 | A1* | 12/2006 | Elien et al. ............ 709/239 |
| 2007/0277158 | A1 | 11/2007 | Li et al. |
| 2008/0059838 | A1 | 3/2008 | Melman et al. |
| 2008/0256014 | A1 | 10/2008 | Gould et al. |
| 2008/0282231 | A1 | 11/2008 | R et al. |
| 2008/0307264 | A1 | 12/2008 | de Halleux et al. |
| 2009/0171720 | A1* | 7/2009 | Crook et al. ............ 705/7 |
| 2010/0100871 | A1 | 4/2010 | Celeskey et al. |
| 2010/0131928 | A1 | 5/2010 | Parthasarathy et al. |

OTHER PUBLICATIONS

Relationship Manager, Andy Bulka, Aug. 21, 2001, (14 pages).
Publish/subscribe, Wikipedia [Online] Retrieved on May 13, 2009 from http://en.wikipedia.org/w/index.php?title=Publish/subscribe&oldid=287586183, (4 pages).
Message queue, Wikipedia [Online], Retrieved on May 13, 2009 from http://en.wikipedia.org/w/index.php?title=Message_queue&oldid=288916537, (3 pages).
A Survey of Verstility for Publish/Subscribe Infrastructures, Roberto S. Silva Filho, May 2005, (77 pages).
Enterprise Service Bus: Theory in Practice, David A. Chappell, Published 2004, Chapter 5, pp. 84 and 85.
International Journal of Production Research, MetaMorph: An Adaptive Agent-Based Architecture for Intelligent Manufacturing, Francisco Maturana et al., [Online] 1999, Retrieved on Jan. 26, 2010 from http://citeseerx.ist.psu.edu/viewdoc/summary?doi=10.1.1.40,6080, pp. 1-11.
SourceMaking, Mediator Design Pattern [Online], Retrieved Apr. 14, 2009 from http://sourcemaking.com/design_patterns/mediatordesignpattern, (7 pages).
ActionScript 3 Design Patterns, The Mediator Sanders, Pattern: A Minimalist Exmaple, William B. Sanders, Jul. 7, 2008 [Online], Retrieved Apr. 14, 2009, http://www.as3dp.com/2008/07/07/the-mediator-design-pattern-a-minimal-example, (8 pages).
Query Caching and Optimization in Distributed mediator Systems, S. Adali et al, 1996, pp. 137-148.
Generating a Test Oracle from Program Documentation, A Thesis Submitted to the School of Graduate Studies in partial fulfillment of the requirements for the degree of Master of Engineering, Peters, Dennis Keith, Apr. 1995 (109 pages).
.TEST Data Sheet: .NET Static Analysis, Code Review, Unit Testing, Security, 1996-2009, Parasoft [Online] http://www.parasoft.com/jsp/products/quick_facts.jsp?product=TestNet, Retrieved on Aug. 4, 2009 (4 pages).
Office Action mailed on Apr. 18, 2012, U.S Appl. No. 12/686,955, filed Jan. 13, 2010 (11 pages).
Office Action dated Ma 22, 2013 issued in U.S. Appl. No. 12/686,955, 17 pp.
Final Office Action dated Sep. 24, 2013 issued in U.S. Appl. No. 12/686,955, 21 pp.
Final Office Action dated Dec. 3, 2012 issued in U.S. Appl. No. 12/686,955, 29 pp.

* cited by examiner

SYSTEM AND METHOD FOR RECEIVING AND TRANSMITTING EVENT INFORMATION

BACKGROUND

The relationships between actors in an enterprise is often very complex. Each actor in an enterprise can monitor many other actors. When one actor takes a particular action, a number of other actors may need to monitor that action and start one of their own. A change made to a single actor can result in the change of many relationships in the enterprise.

Enterprise software is a class of software that manages relationships between actors in an enterprise. Computer programs are able to provide functionality such as automatic email notifications, shared computer memory access, and logistical planning of vehicles.

Many retail enterprises have a number of features that make enterprise software a valuable tool. Often, many stores will be in different geographical locations, central warehouses can supply many different stores, and corporate headquarters can interact with all other locations. Enterprise software can provide functionality to all of these locations.

Enterprise software manages communications between actors in the enterprise software. The relationships between actors can require communications from one or more actors to one or more other actors. When all actors are using the enterprise software, this communication can be fully handled by the enterprise software. These communications can take the form of email and voice mail, generating database reports, or a notification concerning a change in location of an enterprise asset.

SUMMARY

In one example, a process manager is configured to receive events created by elements from other parts of enterprise software and to route the events to listeners within the enterprise software, and an evaluator is queried by the process manager and configured to determine the relationships between the event and the listeners in the enterprise software. In some embodiments, new listeners are added to the enterprise software without a significant change to the process manager.

In another example, a subject optionally performs actions and alerts the enterprise software to events based on those actions and a process manager is configured to receive the events and route them to listeners within the enterprise software. In this example, an evaluator is configured to identify relationships between listeners and events and the process manager is configured to route event information to the listeners identified by the evaluator in some embodiments. In one example, event information not identified by the evaluator is optionally routed to an exception module and new subjects and listeners are optionally added to the system without affecting or reprogramming the process manager.

In a further example, a point-of-sale server processing a sale optionally generates a reduction-in-stock event and an incoming-cash event. The point-of-sale server in this example is configured to route these events to a process manager module, and the process manager module is configured to poll the evaluator to determine if any listeners should receive either event in one example. In certain embodiments, the evaluator is configured to report that a stock management listener optionally receives inventory-adjustment events, and the process manager is configured to place the reduction-in-stock event in a queue for the stock management listener and transmit the incoming-cash event to an exception module. A stock management listener optionally examines the reduction-in-stock event and provide relevant information to a stock database subject.

The details of one or more implementations are set forth in the accompanying drawing and description below. Other features, objects, and advantages will be apparent from the description and drawings, and from the claims.

DESCRIPTION OF DRAWINGS

Like reference symbols in various drawing indicate like elements.

DETAILED DESCRIPTION OF ILLUSTRATIVE IMPLEMENTATIONS

Figure 1:
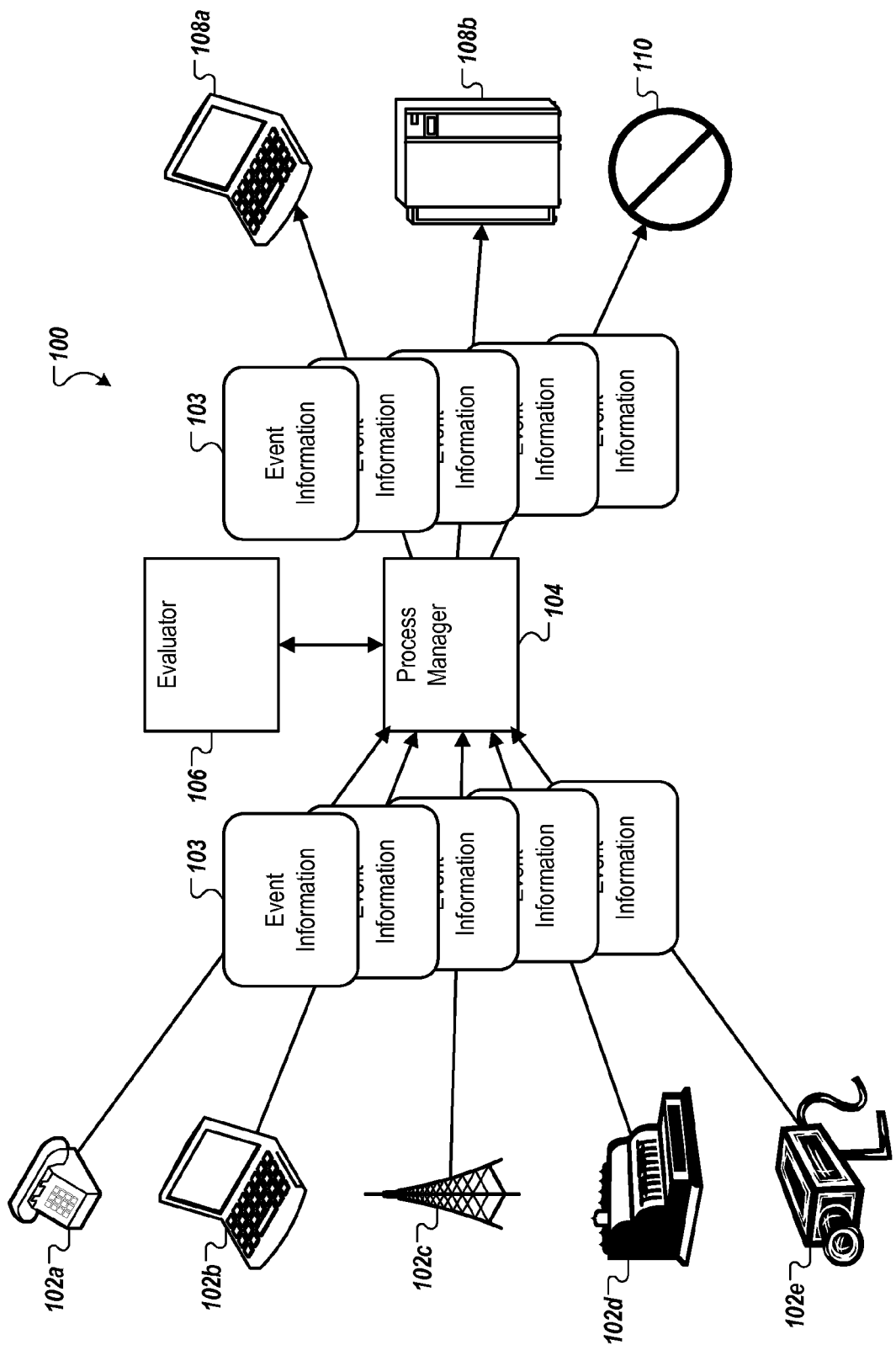
FIG. 1 shows an example communication system for routing messages.

FIG. 1 shows an example communication system 100 for routing messages. Subjects 102 in the communication system 100 perform tasks and create event information 103 related to those tasks. The event information 103 is sent to a process manager 104, which is configured to route the event information 103 to other parts of the communication system 100, such as to listeners 108 or an exception queue 110. An evaluator 106 analyzes event information 103 to determine relationships between the events and objects in the communication system 100.

In some configurations of this implementation, the subjects 102 are electronic and/or computer devices that interact with the communication system 100. Subjects 102 are, in selected embodiments, telephones 102a, computers 102b, communication equipment 102c, point of sale devices 102d, and/or data collection devices 102e. Communication equipment 102c includes, in selected embodiments, internet access points, wireless network adapters, broadcast transmitters, and Ethernet routers. Data collection devices 102e are optionally, in selected embodiments, video cameras, bar code readers, radio frequency identification (RFID) scanners and tags, and/or time card clocks.

In the depicted implementation the event information is information from the subjects 102 including, but not limited to, changes to the status or state of the subject 102, information about a completed or failed task performed by the subjects 102, or responses to requests made by other parts of the communication system 100.

In this implementation, the listeners 108 are objects in the communication system 100 configured to listen for event information 103. In some configurations of this implementation, the listeners 108 are, but are not limited to, personal computers 108a, computing servers 108b, user applications such as email clients and/or instant messaging applications, middleware applications such as software wrappers and/or communication channels, and/or modules of software applications. The listener 108 optionally performs an action upon receiving the event information 103 depending on, for example, the content of the event information 103. For example, an inventory database application listener 108 receives a sales transaction event information 103 and adjust the levels of current inventory.

In this implementation, the process manager 104 is optionally a computing device, program, or module that receives event information 103, requests information about the event information 103, and routes the event information 103 based on the result of the request. In some configurations of this implementation, the process manager 104 is a computing server, a virtual computing server, or a program executing on a computing server or virtual computing server.

In this implementation, the evaluator 106 is a computing device, program, or module that optionally receives event information 103 from the process manager 104, determine one or more relationships between the event information 103 and the listeners 108, and return the relationship information to the process manager 104.

After the process manager 104 requests relationship information from the evaluator 106, the process manager 104 optionally receives data concerning one or more relationships between the event information 103 and the listeners 108. The process manager 104 optionally routes the event information 103 to the listeners 108 identified by the evaluator 106. In some configurations of this implementation, the evaluator 106 might identify no relationships or might not return any relationship information to the process manager 104. In these situations, the process manager 104 routes the event information to an exception queue 110. The exception queue 110 stores event information 103 that is not routed to a listener 108. For example, if the evaluator 106 anomalously fails to identify a relationship, if a subject 102 creates a message that should not be routed to any listener 108, or if the process manager 104 does not wait long enough for a reply from the evaluator 106, the event information is optionally routed to the exception queue 110.

Figure 2:
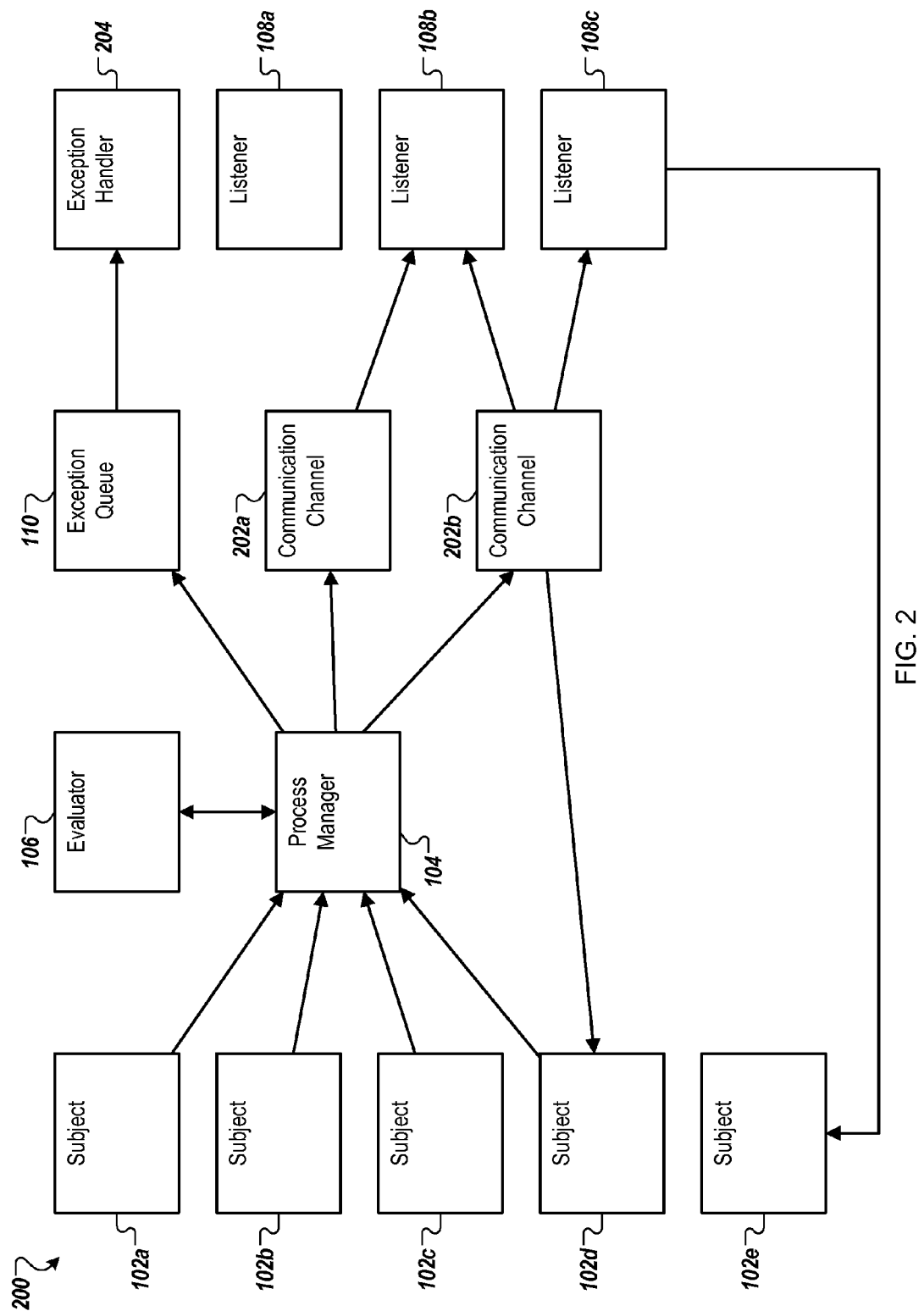
FIG. 2 shows an example computer network for routing event information.

FIG. 2 shows an example computer network 200 for routing event information. The communication channel 202 functions as a network interface used to store and/or transfer messages. The process manager 104 stores a message in the communication channel 202a and one or more of the listeners 108, for example the listeners 108a and 108b, optionally polls, subscribes to, or reads the messages from the communication channel 202a. In some configurations of this implementation, the communication channel 202a deletes old messages when new messages are added, such as when a number or size limit of messages is reached, after some or all listeners 108 have received a message, or when a high priority message is received by the communication channel 202a.

In this implementation, the exception handler 204 functions as a software module that examines the exception queue 110. In some configurations of this implementation, the exception handler 204 optionally uses information about the exception queue 110 to correct an error in the computer network 200, increase the overall efficiency of the computer network 200, or to create metrics that measure the computer network 200.

Other examples of the computer network 200 are optionally configured with more, fewer, or different components that optionally have more, fewer, or different associations than those shown. In some configurations of this implementation, some or all of the listeners 108 are optionally associated with more than one communication channel 202. For example, a listener 108b related to investment information subscribes to the communication channel 202a that relates to stock information, and the communication channel 202b that relates to bond information.

In some configurations of this implementation, some or all of the listeners 108 are not related to any communication channel 202. For example, a listener 108 used for debugging or testing a development version of a web page would not normally be associated with a communications channel 202a. When the listener 108 is to be tested, the listener is temporarily associated with one or more communications channels 202. In this example, the listener 108 registers the associations with the evaluator 106 without a change or update to the process manager 104. In some examples, a new listener 108 is added to the computer network 200 and registers with the evaluator 106 without a change or update to the process manager 104.

In this implementation, text based descriptions of the listeners 108 are stored by the evaluator 106 in a relational database. These descriptions, such as 'financial', 'shipping', and 'prescriptions,' identify the types of messages that the listeners 108 should receive. Additionally, one or more communication channels 202 are associated with the listeners 108. When a subject 102 creates a message, a text based description is included in the messages. The message is paired with the listeners 108 on the basis of the description in order to determine relationships between the message and the listeners 108.

When a new listener 108 is added to the computer network 200, the listener 108 registers with the evaluator 106. The new listener 108 provides the listener 108's identification, the communication channels 202 that the new listener 108 is associated with, and one or more descriptions that apply to the new listener 108. If the communication channel 202 identified by the new listener 108 not already in the evaluator's 106 database, the evaluator 106 provides a reference to the communication channel 202 to the process manager 104. The process manager 104 adds this reference to its collection of communication channels 202. The process manager 104 does not need to rebuild a list of possible subjects 102, communication channel 202, or listeners 108 when the reference to a new communication channel 202 is received, or when the new listener 108 registers with the evaluator 106.

In other implementations, the evaluator 106 optionally stores relationships between subjects 102 and listeners 108 in directed graphs with subjects 102 and listeners 108 as nodes and communications as edges. A message from the subjects 102 are related to listeners 108 if there is an edge between the nodes that represent the subjects 102 and listeners 108. In these implementations, a new listener 108 that registers with the evaluator 106 includes communication channels 202 and information about the subjects 102 that the new listener 108 should receive messages from. The evaluator 106 updates its directed graph, and if the communication channel 202 registered by the new listener 108 is new, provides a reference to the communication channel 202 to the process manager 104 as described above.

In some configurations of this implementation, some or all of the communication channels 202 are related to more than one listener 108. In one example, the communication channel 202b is related to GPS information about the location of vehicles. The listener 108b, for example related to fuel consumption, and a listener 108c, for example related to rental car reservations, are both related to the communications channel 202b in this example.

In some configurations of this implementation, some or all of the listeners 108 are associated with a subject 102. For example, the listener 108c is a software module that optionally interprets received messages and translates them into a message for the subject 102e. A message, such as a request for a new employee ID, is received by the listener 108c. The listener 108c optionally creates a standard query language (SQL) command to add a new employee to the employee database subject 102e and sends the SQL command to the subject 102e.

In some configurations of this implementation, some or all of the subjects 102 are also a listener 108. For example, the subject 102d is associated with the communication channel 202b. The subject 102a optionally creates a message related to internet availability. The message is routed to the communications channel 202b, which is related to diagnostic information about the computer network 200. The subject 102b is optionally an information technology (IT) help desk manager which reads information about the computer network 200 from the communications channel 202b.

Figure 3:
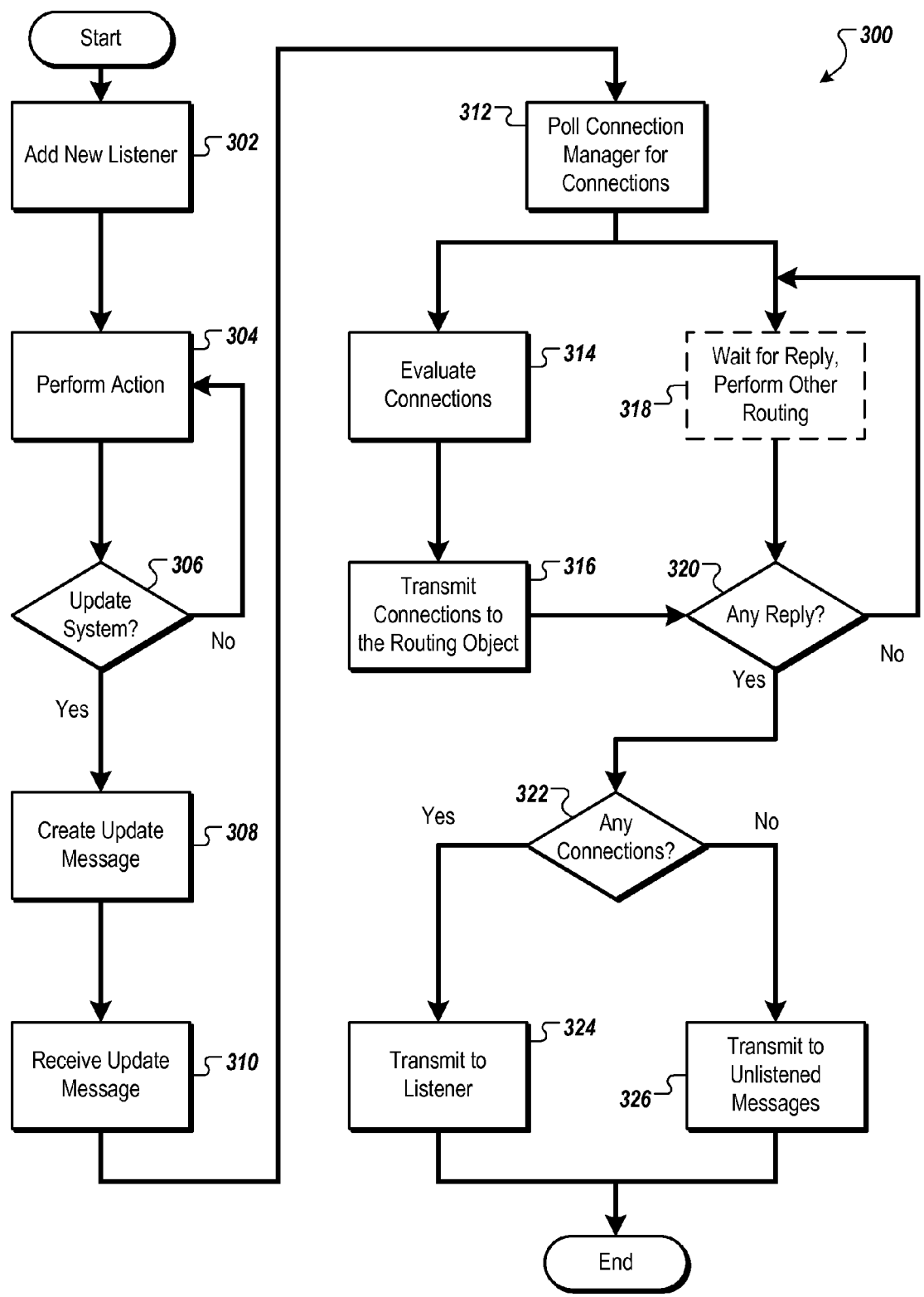
FIG. 3 is a flow chart showing an example process for routing messages in a computer system.

FIG. 3 is a flow chart showing an example process 300 for routing messages in a computer system, such as the computer network 200.

A connection manager object performs the step of adding 302 a reference to a listener object. The connection manager stores a collection of listener objects that optionally receive messages. In some configurations, these references are stored as part of a relational or object oriented database, as a node in a directed graph, and/or in other formats.

An actor object performs the step of performing 304 an action. An actor optionally stores data, processes business events like sales or logistics plans, and/or executes other behavior.

The subject performs the step of determining 306 if a produced message should be sent to other objects in the system. Some other actors optionally require information about actions taken by the subject, and the subject determines if any such other actor exists to receive information about the action. In some configurations, the determination 306 is based on rules, logic, or behavior programmed into a subject, and the determination 306 is performed based on the state or composition of a computer network.

The subject performs the step of creating 308 an update message. This message is optionally email, an object oriented object, a serialized string of characters, and/or other formats. In some configurations the message includes metadata about the subject or action taken by the subject, such as the state of the subject, date and time information, and/or error codes.

A routing object performs the step of receiving 310 an update message from the subject. In some configurations, the routing object receives many messages concurrently and from many different sources.

The routing object performs the step of polling 312 for connections between received messages and objects in the system. Some messages are of a certain type, of a particular classification, or within some predefined measurements. Based on these features, the messages are optionally related to other objects in the system. The routing object optionally polls the connection manager for these connections.

The connection manager performs the step of evaluating 314 a connection between a message and an object. A listener that registers with the connection manager optionally specifies a particular message ID. The connection evaluates the messages and identifies a connection between a message and the listener if the listener has, for example, the same message ID.

The connection manager performs the step of transmitting 316 the connection information to the routing object. In some configurations, if no connections are found, the connection manager transmits a message specifying that no connections were found. In some alternative implementations, the connection manager returns no message with a particular time frame, in which case the routing object assumes that no connection information was found.

The routing object performs the step of waiting 318 for a reply message from the connection manager. While the routing object waits, it optionally performs other actions such as routing other messages and/or other steps of the process 300.

The routing object performs the step of determining 320 if any connections were returned by the connection manager. If the routing object has not received any reply and if a delay period has not elapsed, the routing object continues the waiting 318.

The routing object performs the step of determining 322 if any connections were identified by the connection manager. The determining 322 includes determining if no response has been received during a particular time window.

The routing object performs the step of transmitting 324 the message to the listener. In some configurations, the transmitting includes routing the message through one or more intermediaries, for example for logging, reliability, and/or architectural flexibility reasons.

The routing object performs the step of transmitting 326 the message to an unlistened message object. In some configurations, the unlistened message object includes messages that were erroneously or correctly identified as being unrelated to other objects. In some implementations, the unlistened message object includes a deletion or garbage collection functionality to remove the unlistened message from the system.

A particular order and number of steps are described here for the process 300. However, it will be appreciated that the number, order, and type of steps required for the process 300 is optionally different in other examples.

Figure 4:
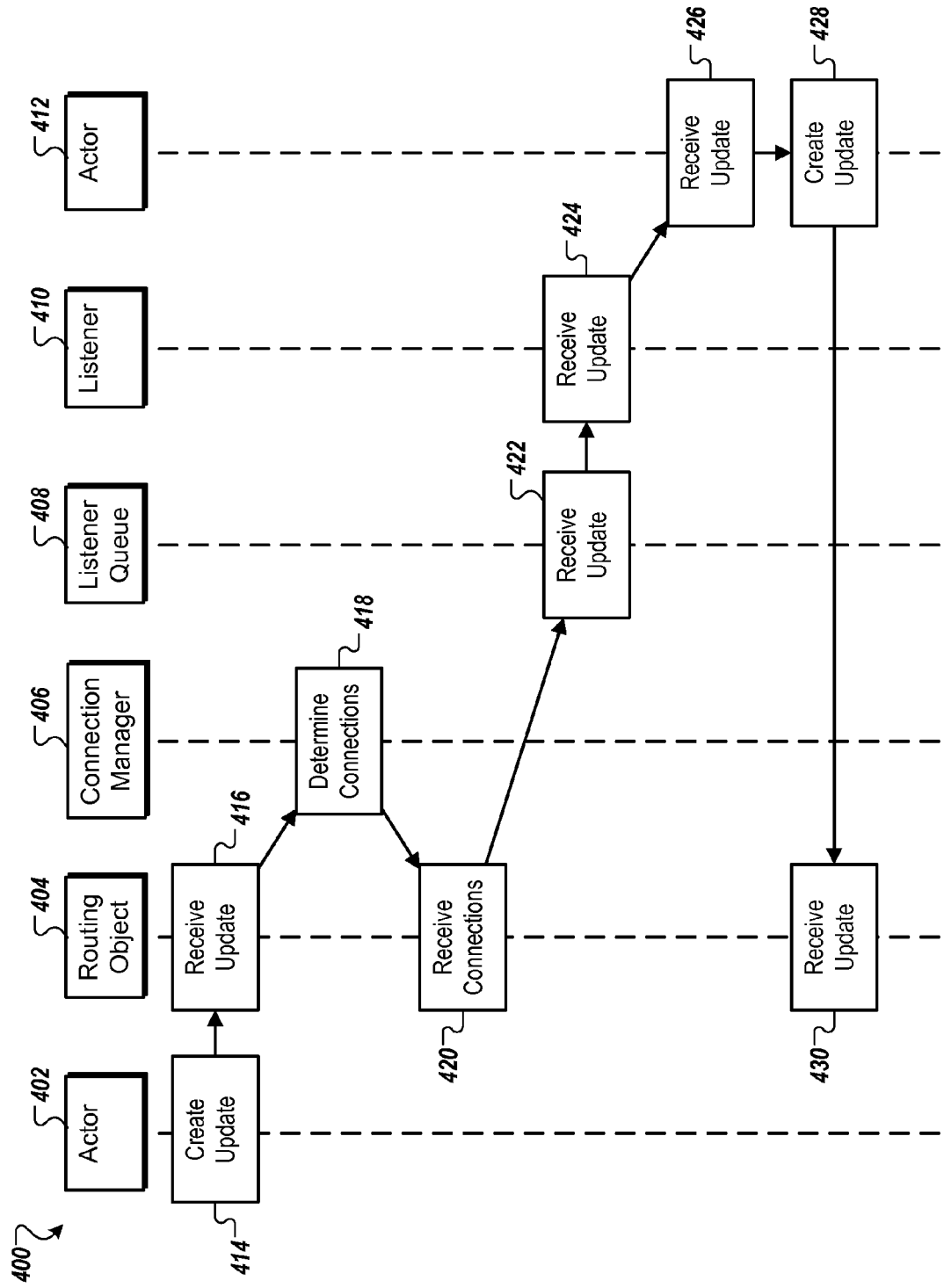
FIG. 4 is a swim lane diagram of an example enterprise software system for routing messages.

FIG. 4 is a swim lane diagram of a example enterprise software system 400 for routing messages. The figure includes an example message that triggers the creation of another message. The enterprise software system 400 contains actors 402, 412, a routing object 404, a connection manager 406, a listener queue 408, and a listener 410. In this implementation, the actors 402 and 412 are objects that interact with the enterprise software system and carry out business logic. The routing object is a middleware application used to receive and transmit information. The connection manager 406 is an object that records the state, and changes made to, the enterprise software system 400. The listener queue 408 is a message queue used to transmit messages to one or more components of the enterprise software system 400. The listener 410 is a communication wrapper that observes the listener queue 408 and translates messages for the actor 412. The actor 412 is a business logic application that performs an action in response to receiving an update message generated by the actor 402.

The actor 402 performs an action and generates an update message 414. In this implementation, the action is the processing of an invoice received by an accounting department.

The routing object 404 receives the update message 416. In this implementation, the routing object places the update event into a temporary storage location and associates a message identification number.

The routing connection manager 406 determines a connection 418 between the update message and the actor 412. In this implementation, the actor 412 is an available funds database, and the payment of an accounts payable bill causes an adjustment to the available funds information controlled by the actor 412.

The routing object 404 receives the connections 420. In this implementation, the routing object receives a list of listener queues and a message identification number. The routing object routes the message with the message identification number to the listener queues in the list. In some instances, the list of listener queues optionally has one or no entries.

The listener queue 408 receives the update message 422. In this implementation, the update message enqueued into the tail of the queue.

The listener 410 receives the update message 424. In this implementation, the listener 410 dequeues messages from the head of the listener queue 408 until it dequeues the update message related to the accounts payable message. The listener 410 translates the update message into a command that is executable by the actor 412.

The actor 412 receives the update message 426, which has been translated by the listener 410. The update message causes the actor 412 to adjust account balances and to create a message 428 indicating that a check should be cut and mailed to a vendor.

The routing object 404 receives the update message 430. The update message indicates that a check should be cut and mailed to a vendor.

Further process of the enterprise software system 400, which is not shown, optionally include routing the example message to a printer station and to an email server that creates an email notification to a mail room with directions for mailing a check.

Figure 5:
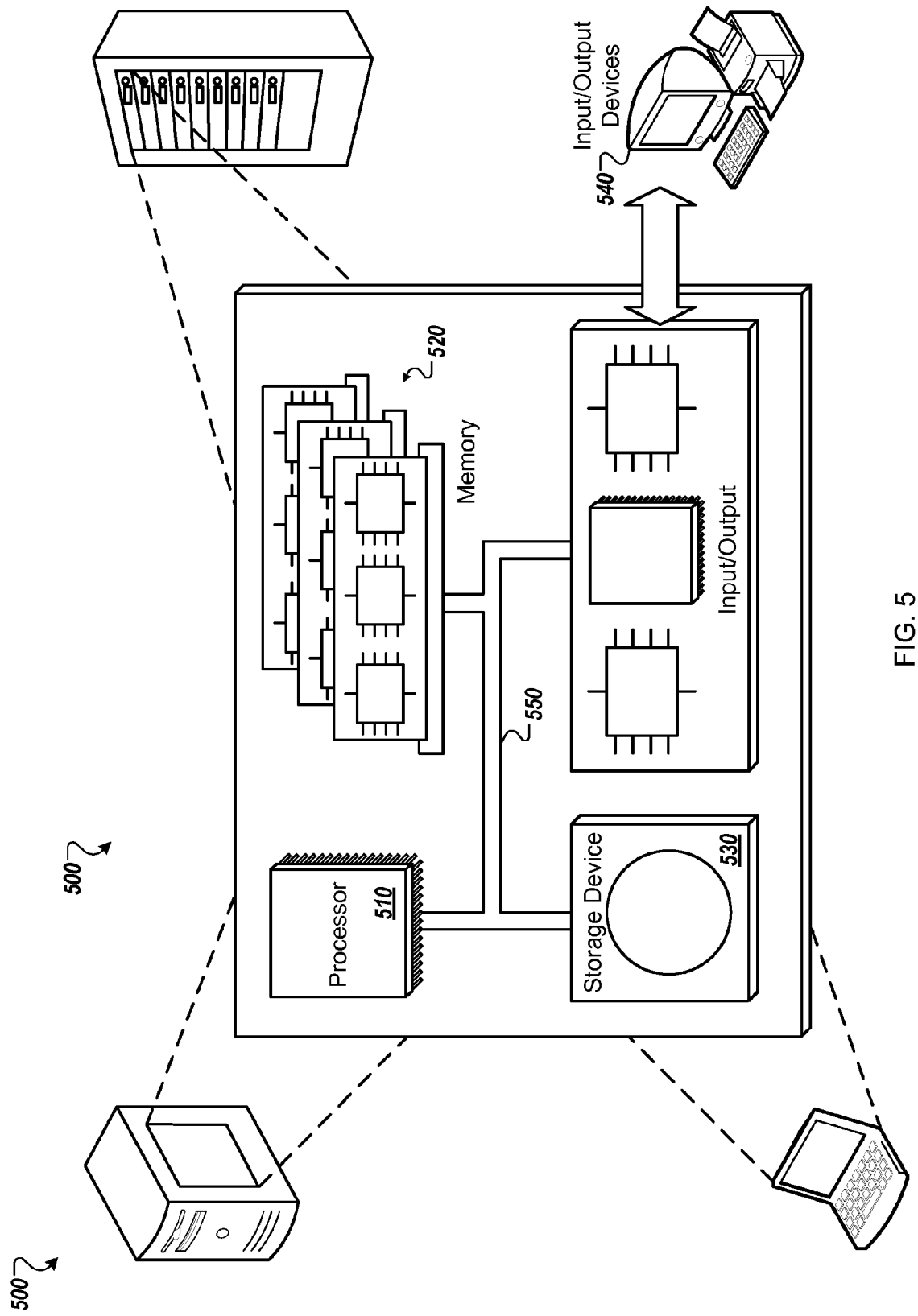
FIG. 5 is a block diagram of a computing system optionally used in connection with computer-implemented methods described in this document.

FIG. 5 is a schematic diagram of a generic computer system 500. The system 500 is optionally used for the operations described in association with any of the computer-implement methods described previously, according to one implementation. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 is optionally a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

In some examples, the features described are implemented in digital electronic circuitry, or in computer hardware, firmware, software, or in combinations of them. The apparatus is optionally implemented in a computer program product tangibly embodied in an information carrier, e.g., in a machine-readable storage device or in a propagated signal, for execution by a programmable processor; and method steps are performed by a programmable processor executing a program of instructions to perform functions of the described implementations by operating on input data and generating output. The described features are optionally implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that are optionally used, directly or indirectly, in a computer to perform a certain activity or bring about a certain result. A computer program is optionally written in any form of programming language, including compiled or interpreted languages, and it is deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory are optionally supplemented by, or incorporated in, ASICs (application-specific integrated circuits).

To provide for interaction with a user, the features in some instances are implemented on a computer having a display device such as a CRT (cathode ray tube) or LCD (liquid crystal display) monitor for displaying information to the user and a keyboard and a pointing device such as a mouse or a trackball by which the user provides input to the computer.

The features are optionally implemented in a computer system that includes a back-end component, such as a data server, or that includes a middleware component, such as an application server or an Internet server, or that includes a front-end component, such as a client computer having a graphical user interface or an Internet browser, or any combination of them. The components of the system are connected by any form or medium of digital data communication such as a communication network. Examples of communication networks include, e.g., a LAN, a WAN, and the computers and networks forming the Internet.

The computer system optionally includes clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications are optionally made without departing from the spirit and scope of this disclosure. Accordingly, other embodiments are within the scope of the following claims.

What is claimed is:

1. A system for receiving and transmitting event information, the system comprising:
   a subject module to perform one or more tasks and to transmit event information associated with the tasks;
   a process manager module to receive the event information and to route the event information;
   a listener module configured to receive the event information; and
   an evaluator module comprising a processor configured to receive the event information, to determine one or more relationships between the event information and the listener module, and to transmit data concerning the one or more relationships to the process manager module, the one or more relationships being defined according to descriptions of the listener module relative to the event information, wherein the listener module is identified by the data;
   wherein the subject module unilaterally transmits the event information to the process manager module, and in response, the process manager module unilaterally transmits the event information to the listener module based on relevance of the event information to the listener module or to an exception module according to the data;
   wherein the listener module, upon receipt of the event information, analyzes the event information and optionally executes tasks in response to the event information; and
   wherein additional listener modules can be added to the system without substantial modification of the process manager module.

2. The system of claim 1, wherein a multiplicity of subject modules can be added to the system without a substantial change to the process manager module.

3. The system of claim 1, wherein the process manager module sends event information to the listener module through a listener queue.

4. The system of claim 1, wherein the process manager module sends event information to the exception module if no listener module is identified by the evaluator module.

5. The system of claim 1, wherein the exception module analyzes incoming event information to detect an error in the system.

6. The system of claim 1, wherein the listener module is associated with the subject module.

7. The system of claim 6, wherein event information received by the listener module is routed to the subject module.

8. The system of claim 7, wherein the event information routed to the subject module is translated by the listener module.

9. The system of claim 1, wherein the subject module is a listener module.

10. A computer-implemented method for receiving and transmitting event information, the method comprising:
    receiving, at a routing object, as a result of performance of one or more tasks, an update message from an actor object, the update message including a text based description that identifies content of the update message;
    polling, at a routing object, a connection manager object for connections;
    evaluating, at the connection manager object, a connection between the update message and a subscriber based at least in part on the text based description via the content of the update message, wherein the text-based description included in the update message serves as an identifier for the evaluating step to determine the connection between the update message and the subcriber;
    at the connection manager object, transmitting to the routing object data concerning the connection, wherein the subscriber is identified by the data;
    unilaterally transmitting, at the routing object, the update message to the subscriber or to an unlistened message object; and
    adding, at the connection manager object, a reference to a subscriber without a substantial reprogramming of the routing object.

11. The method of claim 10, wherein the routing object sends the update message to the unlistened message object if no subscriber is identified by the data.

12. The method of claim 10, wherein the polling includes transmitting metadata from the update message.

13. The method of claim 10, wherein the subscriber is also an actor.

14. A non-transitory computer-readable medium having recorded therein instructions for receiving and transmitting event information, the method comprising:
    receiving, at a routing object, an update message from an actor object, the update message including a text-based description that identifies content of the update message;
    polling, at a routing object, a connection manager object for connections;
    evaluating, at the connection manager object, a connection between the update message and a listener based on the text-based description included in the update message via the content of the update message, wherein the text-based description included in the update message serves as an identifier for the evaluating step to determine the connection between the update message and the subscriber;
    at the connection manager object, transmitting to the routing object data concerning the connection;
    transmitting, at the routing object, the update message to the listener or to an unlistened message object;
    adding, at the connection manager object, a reference to a listener without a substantial reprogramming of the routing object.

15. The computer-readable medium of claim 14, wherein the routing object sends the update message to the listener and wherein the listener is identified by the data.

16. The computer-readable medium of claim 14, wherein the routing object sends the update message to the unlistened message object if no listener is identified by the data.

17. The computer-readable medium of claim 14, wherein the polling includes transmitting metadata from the update message.

18. The computer-readable medium of claim 14, wherein the listener is also an actor.

* * * * *